United States Patent
Liu et al.

(10) Patent No.: US 10,581,497 B2
(45) Date of Patent: Mar. 3, 2020

(54) TRANSMIT DIVERSITY METHOD, TERMINAL, AND BASE STATION

(71) Applicant: HUAWEI TECHNOLOGIES CO., LTD., Shenzhen, Guangdong (CN)

(72) Inventors: Kunpeng Liu, Beijing (CN); Xueru Li, Beijing (CN); Bingyu Qu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/504,832

(22) Filed: Jul. 8, 2019

(65) Prior Publication Data
US 2019/0334591 A1  Oct. 31, 2019

Related U.S. Application Data

(63) Continuation of application No. PCT/CN2018/071274, filed on Jan. 4, 2018.

(30) Foreign Application Priority Data

Jan. 7, 2017  (CN) .......................... 2017 1 0011667

(51) Int. Cl.
*H04B 7/0456* (2017.01)
*H04L 5/00* (2006.01)
*H04B 7/06* (2006.01)

(52) U.S. Cl.
CPC ......... *H04B 7/0456* (2013.01); *H04B 7/0626* (2013.01); *H04B 7/0639* (2013.01); *H04L 5/0048* (2013.01)

(58) Field of Classification Search
CPC .. H04B 7/0456; H04B 7/0639; H04B 7/0626; H04L 5/0048
See application file for complete search history.

(56) References Cited

U.S. PATENT DOCUMENTS

| | | | |
|---|---|---|---|
| 10,009,087 B2 * | 6/2018 | Liu | H04B 7/0417 |
| 10,063,296 B2 * | 8/2018 | Wang | H04B 7/0456 |
| 2017/0099093 A1 * | 4/2017 | Zhang | H04B 7/0456 |
| 2018/0167115 A1 * | 6/2018 | Zhu | H04B 7/0478 |

FOREIGN PATENT DOCUMENTS

| | | |
|---|---|---|
| EP | 2557700 A2 | 2/2013 |
| EP | 3018852 A1 | 5/2016 |
| EP | 3447952 A1 | 2/2019 |

OTHER PUBLICATIONS

Extended European Search Report issued in European Application No. 18736535.8 dated Dec. 11, 2019, 9 pages.

* cited by examiner

*Primary Examiner* — Vineeta S Panwalkar
(74) *Attorney, Agent, or Firm* — Fish & Richardson P.C.

(57) ABSTRACT

The present disclosure relates to information feedback methods and apparatus. One example method includes receiving signaling from a base station, where the signaling is used to instruct to feed back transmit diversity-based channel state information and sending feedback information to the base station, where the feedback information includes precoding matrix indicator (PMI), the PMI is used to indicate a precoding matrix in a precoding matrix set, and a structure of the precoding matrix is one of two specific structures.

19 Claims, 2 Drawing Sheets

Receive signaling sent by a base station, where the signaling is used to instruct to feed back transmit diversity-based channel state information — 101

Send feedback information to the base station, where the feedback information includes precoding indication information PMI — 102

TRANSMIT DIVERSITY METHOD, TERMINAL, AND BASE STATION

CROSS-REFERENCE TO RELATED APPLICATIONS

This application is a continuation of International Application No. PCT/CN2018/071274, filed on Jan. 4, 2018, which claims priority to Chinese Patent Application No. 201710011667.5, filed on Jan. 7, 2017. The disclosures of the aforementioned applications are hereby incorporated by reference in their entireties.

TECHNICAL FIELD

The present invention relates to the field of communications technologies, and in particular, to precoding information sending and feedback technologies.

BACKGROUND

In a wireless communications system, if a transmit end (for example, a base station) can learn of channel state information (channel status information, CSI for short) in some manner, the transmit end can optimize a to-be-sent signal based on channel characteristics, to improve signal received quality and overall system performance.

However, in an FDD system, CSI can usually be accurately obtained only by a receive end. When a transmit end needs to obtain CSI, the receive end needs to feed back information related to the CSI to the transmit end. For example, in a Long Term Evolution (Long Term Evolution, LTE for short) system, user equipment (user equipment, UE for short) does not directly feed back channel information, but recommends a precoding matrix to a transmit end such as a base station. The precoding matrix is used by the base station to precode data. For example, the UE may feed back a precoding matrix indicator (precoding matrix indicator, PMI for short) to the base station, and the PMI may be based on a double codebook structure. Based on the double codebook structure, the PMI may be split into a PMI 1 and a PMI 2. The PMI 1 is used to select a group of basis vectors, and the PMI 2 is used to select at least one basis vector from the group of basis vectors selected by using the PMI 1, and select a phase difference between two polarization directions. After receiving the PMI 1 and the PMI 2, the base station finds corresponding code words W1 and W2 in a stored codebook C and obtains a precoding matrix according to a preset function rule F(W1, W2). In addition, the user equipment has various codebook feedback manners.

PMI feedback is related to a data transmission method used by the base station. In a transmit diversity (for example, space frequency block coding, spatial frequency block coding, SFBC for short) transmission method, the base station sends a demodulation reference signal (DM-RS) and data to the user equipment through two antenna ports. To determine two antenna ports through which data is sent to the user equipment, a receive end needs to estimate state information of a channel from the base station to the receive end and feed back a PMI to the base station.

In a next generation wireless communications system, to resist severe attenuation of high-band signals, more antennas are required. Consequently, beams become narrower and are more easily blocked. In the prior art, beams corresponding to two ports in SFBC are basically consistent in direction, and therefore, when beam blocking occurs, the beams corresponding to the two ports are blocked, which severely affects transmission performance. In addition, data or a DM-RS on each port is precoded by using a plurality of antennas in only one polarization direction, and a beamforming gain generated when all antennas in two polarization directions are used for precoding cannot be obtained.

SUMMARY

Embodiments of the present invention provide a transmit diversity-based data transmission method, so as to improve transmit efficiency and system robustness.

According to one aspect, the present invention provides an information feedback method, where the method includes: receiving signaling sent by a base station, where the signaling is used to instruct to feed back transmit diversity-based channel state information; and sending feedback information to the base station, where the feedback information includes precoding indication information PMI, the PMI is used to indicate a precoding matrix in a precoding matrix set, and a structure of the precoding matrix includes at least one of $$\begin{bmatrix} W_1 & 0 \\ 0 & W_2 \end{bmatrix}$$

and $$\begin{bmatrix} W_1 & W_2 \\ \varphi W_1 & -\varphi W_2 \end{bmatrix},$$

where $W_1$ and $W_2$ are different vectors, and $\varphi$ is a phase factor. The method may be implemented by user equipment UE or a computer readable storage medium. The computer readable storage medium includes an instruction, and when the instruction is run on a computer, the computer performs each method implemented in this aspect.

According to the method, precoding vectors corresponding to layers of the precoding matrix are distinguished between each other, so that beam blocking can be effectively avoided, and transmission performance can be improved.

In a possible design, the PMI includes a first PMI and a second PMI, the first PMI and the second PMI are used to jointly indicate the precoding matrix in the precoding matrix set, the first PMI is used to indicate a column vector set, and the second PMI is used to indicate a first column vector and a second column vector in the column vector set.

In a possible design, the first column vector indicates a $K^{th}$ column in the column vector set, and the second column vector indicates an $L^{th}$ column in the column vector set, where an absolute value of a difference between K and L is greater than or equal to n, K and L are positive integers, and a value of n is greater than or equal to 1.

In a possible design, the method further includes: receiving M reference signals sent by the base station through M antenna ports, where the M reference signals are respectively associated with precoding vectors, and M is an integer greater than or equal to 2; where the PMI is used to indicate two antenna ports in the M antenna ports, an interval between port numbers of the two antenna ports is n, and the value of n is greater than or equal to 1.

In a possible design, the value of n is configured by the base station by using signaling, or n is a predefined value.

According to another aspect, an embodiment of the present invention provides user equipment for implementing the foregoing information feedback method, including a transceiver and a processor, where the transceiver is configured to receive signaling sent by a base station, where the signaling is used to instruct to feed back transmit diversity-based channel state information; the processor is configured to generate feedback information, where the feedback information includes precoding indication information PMI, the PMI is used to indicate a precoding matrix in a precoding matrix set, and a structure of the precoding matrix includes at least one of $$\begin{bmatrix} W_1 & 0 \\ 0 & W_2 \end{bmatrix}$$

and $$\begin{bmatrix} W_1 & W_2 \\ \varphi W_1 & -\varphi W_2 \end{bmatrix},$$

where $W_1$ and $W_2$ are different vectors, and $\varphi$ is a phase factor; and the transceiver is further configured to send the feedback information to the base station.

In a possible design, the PMI includes a first PMI and a second PMI, the first PMI and the second PMI are used to jointly indicate the precoding matrix in the precoding matrix set, the first PMI is used to indicate a column vector set, and the second PMI is used to indicate a first column vector and a second column vector in the column vector set.

In a possible design, the first column vector indicates a $K^{th}$ column in the column vector set, and the second column vector indicates an $L^{th}$ column in the column vector set, where an absolute value of a difference between K and L is greater than or equal to n, K and L are positive integers, and a value of n is greater than or equal to 1.

In a possible design, the UE further includes:

In a possible design, the transceiver is further configured to receive M reference signals sent by the base station through M antenna ports, where the M reference signals are respectively associated with precoding vectors; and the PMI is used to indicate two antenna ports in the M antenna ports, an interval between port numbers of the two antenna ports is n, M is an integer greater than or equal to 2, and the value of n is greater than or equal to 1.

In a possible design, the transceiver learns of the value of n by receiving the signaling sent by the base station, or the value of n is predefined.

According to still another aspect, the present invention provides an information feedback method, where the method includes: selecting a precoding matrix from a precoding matrix set, where a structure of the precoding matrix includes at least one of $$\begin{bmatrix} W_1 & 0 \\ 0 & W_2 \end{bmatrix}$$

and $$\begin{bmatrix} W_1 & W_2 \\ \varphi W_1 & -\varphi W_2 \end{bmatrix},$$

$W_1$ and $W_2$ are different vectors, $\varphi$ is a phase factor, and the precoding matrix is used for transmit diversity-based data transmission; and precoding a to-be-sent signal by using the selected precoding matrix. The method may be implemented by a base station or a computer readable storage medium. The computer readable storage medium includes an instruction, and when the instruction is run on a computer, the computer performs each method implemented in this aspect. According to the method, precoding vectors corresponding to layers of the precoding matrix are distinguished between each other, so that beam blocking can be effectively avoided, and transmission performance can be improved.

In a possible design, the precoding a to-be-sent signal by using the selected precoding matrix includes: precoding a signal matrix by using the precoding matrix, where a structure of the signal matrix is $$\begin{bmatrix} s_1 & s_2 \\ -s_2^* & s_1^* \end{bmatrix},$$

where $S_1$ is a first part of the to-be-sent signal, $S_2$ is a second part of the to-be-sent signal, and * is a conjugate symbol.

In a possible design, data sent on a first antenna port in the signal matrix is precoded by using a column of the precoding matrix, and data sent on a second antenna port in the signal matrix is precoded by using another column of the precoding matrix.

In a possible design, the data sent on the first antenna port is in a row of the signal matrix, and the data sent on the second antenna port is in another row of the signal matrix.

In a possible design, the method further includes: sending signaling to user equipment UE, where the signaling is used to instruct to feed back transmit diversity-based channel state information.

In a possible design, the method further includes: receiving a precoding matrix indicator PMI sent by the UE, where the PMI is used to indicate the precoding matrix, and the structure of the precoding matrix includes at least one of $$\begin{bmatrix} W_1 & 0 \\ 0 & W_2 \end{bmatrix}$$

and $$\begin{bmatrix} W_1 & W_2 \\ \varphi W_1 & -\varphi W_2 \end{bmatrix},$$

where $W_1$ and $W_2$ are different vectors, and $\varphi$ is a phase factor.

In a possible design, the PMI includes a first PMI and a second PMI, the first PMI and the second PMI are used to jointly indicate the precoding matrix, the first PMI is used to indicate a column vector set, and the second PMI is used to indicate a first column vector and a second column vector in the column vector set.

In a possible design, the first column vector indicates a $K^{th}$ column in the column vector set, and the second column vector indicates an $L^{th}$ column in the column vector set, where an absolute value of a difference between K and L is greater than or equal to n, K and L are positive integers, and a value of n is greater than or equal to 1.

In a possible design, the PMI is used to indicate two antenna ports in M antenna ports of the base station, and an interval between port numbers of the two antenna ports is n, where M is an integer greater than or equal to 2, and the value of n is greater than or equal to 1.

In a possible design, the value of n is indicated by using the signaling sent to the UE, or n is a predefined value.

According to yet another aspect, the present invention provides a base station for implementing the foregoing information feedback method and the method for determining a precoding matrix, including a memory and a processor, where the processor is configured to select a precoding matrix from a precoding matrix set and precode a to-be-sent signal by using the selected precoding matrix, where a structure of the precoding matrix includes at least one of $$\begin{bmatrix} W_1 & 0 \\ 0 & W_2 \end{bmatrix}$$

and $$\begin{bmatrix} W_1 & W_2 \\ \varphi W_1 & -\varphi W_2 \end{bmatrix},$$

$W_1$ and $W_2$ are different vectors, $\varphi$ is a phase factor, and the precoding matrix is used for transmit diversity-based data transmission.

In a possible design, the precoding a to-be-sent signal by using the selected precoding matrix includes: precoding a signal matrix by using the precoding matrix, where a structure of the signal matrix is $$\begin{bmatrix} s_1 & s_2 \\ -s_2^* & s_1^* \end{bmatrix},$$

where $S_1$ is a first part of the to-be-sent signal, $S_2$ is a second part of the to-be-sent signal, and * is a conjugate symbol.

In a possible design, the processor precodes, by using a column of the precoding matrix, data sent on a first antenna port in the signal matrix, and precodes, by using another column of the precoding matrix, data sent on a second antenna port in the signal matrix.

In a possible design, the data sent on the first antenna port is in a row of the signal matrix, and the data sent on the second antenna port is in another row of the signal matrix.

In a possible design, the base station includes a transceiver, and the transceiver is configured to send signaling to user equipment UE, where the signaling is used to instruct to feed back transmit diversity-based channel state information.

In a possible design, the base station includes the transceiver, and the transceiver is configured to receive a precoding matrix indicator PMI sent by the UE, where the PMI is used to indicate the precoding matrix, and the structure of the precoding matrix includes at least one of $$\begin{bmatrix} W_1 & 0 \\ 0 & W_2 \end{bmatrix}$$

and $$\begin{bmatrix} W_1 & W_2 \\ \varphi W_1 & \varphi W_2 \end{bmatrix},$$

where $W_1$ and $W_2$ are different vectors, and $\varphi$ is a phase factor.

In a possible design, the PMI includes a first PMI and a second PMI, the first PMI and the second PMI are used to jointly indicate the precoding matrix, the first PMI is used to indicate a column vector set, and the second PMI is used to indicate a first column vector and a second column vector in the column vector set.

In a possible design, the first column vector indicates a $K^{th}$ column in the column vector set, and the second column vector indicates an $L^{th}$ column in the column vector set, where an absolute value of a difference between K and L is greater than or equal to n, K and L are positive integers, and a value of n is greater than or equal to 1.

In a possible design, the base station includes M antenna ports, the PMI is used to indicate two antenna ports in the M antenna ports of the base station, and an interval between port numbers of the two antenna ports is n, where M is an integer greater than or equal to 2, and the value of n is greater than or equal to 1.

In a possible design, the value of n is indicated by using the signaling sent by the transceiver, or n is a predefined value.

According to still yet another aspect of this application, a computer program product including an instruction is provided, where when the computer program product is run on a computer, the computer performs the methods according to the foregoing aspects. According to the foregoing implementations, the following problem can be resolved: When the base station sends data or a DM-RS reference signal in a downlink manner, beams corresponding to two ports of the base station are basically consistent in direction. Further, the base station obtains a precoding matrix based on different precoding vectors, and a system can obtain a beamforming gain generated when all antenna ports in two polarization directions are used for precoding.

DESCRIPTION OF EMBODIMENTS

A network architecture and a service scenario that are described in embodiments of the present invention are intended to describe technical solutions in the embodiments of the present invention more clearly, and do not constitute any limitation to the technical solutions provided in the embodiments of the present invention. A person of ordinary skill in the art may be aware that as the network architecture evolves and a new service scenario appears, the technical solutions provided in the embodiments of the present invention are also applicable to a similar technical problem.

Figure 5:
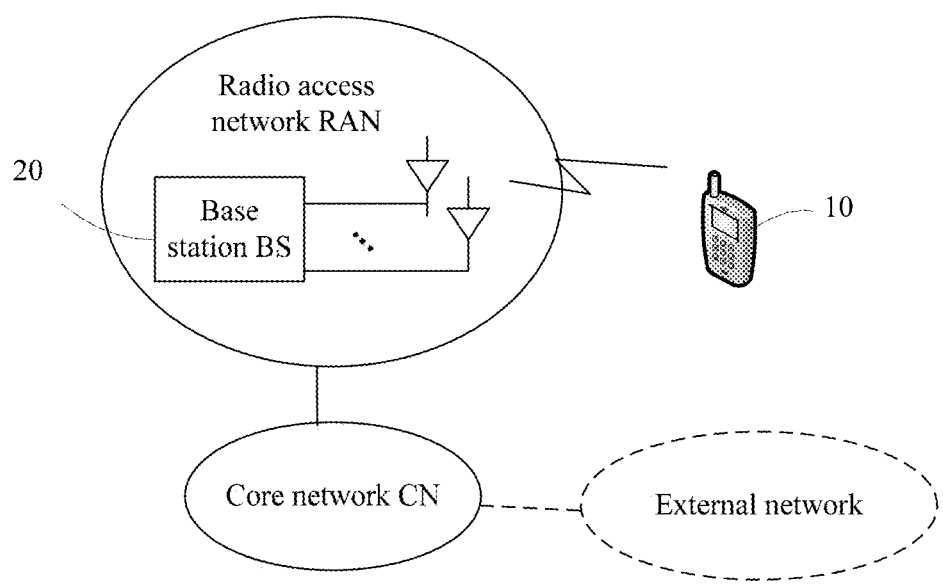
FIG. 5 is a schematic diagram of a system network according to an embodiment of the present invention.

FIG. 5 is a schematic diagram of a possible system network in the present invention. As shown in FIG. 5, at least one user equipment UE 10 communicates with a radio access network (radio access network, RAN for short). The RAN includes at least one base station 20 (base station, BS for short). For clarity, only one base station and only one UE are shown in the figure. The RAN is connected to a core network (core network, CN for short). Optionally, the CN may be coupled to one or more external networks (External Network) such as the Internet and a public switched telephone network (public switched telephone network, PSTN for short).

For ease of understanding, the following describes some terms in this application.

In this application, the terms "network" and "system" are often used interchangeably, but a person skilled in the art may understand their meanings. User equipment (English: User Equipment, UE for short) is a terminal device having a communication function and may include a handheld device having a wireless communication function, an in-vehicle device, a wearable device, a computing device, another processing device connected to a wireless modem, or the like. User equipment in different networks may have different names such as a terminal, a mobile station, a subscriber unit, a station, a cellular phone, a personal digital assistant, a wireless modem, a wireless communications device, a handheld device, a laptop computer, a cordless phone, and a wireless local loop station. For ease of description, these devices are referred to as user equipment or UE for short in this application. A base station (base station, BS for short), also referred to as a base station device, is a device deployed in a radio access network to provide a wireless communication function. A base station in different wireless access systems may have different names. For example, a base station in a Universal Mobile Telecommunications System (Universal Mobile Telecommunications System, UMTS for short) network is referred to as a NodeB (NodeB), and a base station in an LTE network is referred to as an evolved NodeB (evolved NodeB, eNB or eNodeB for short).

In a system using a multiple-input multiple-output (Multiple Input Multiple Output, MIMO for short) technology, a plurality of transmit antennas and a plurality of receive antennas are used to transmit data or a demodulation reference signal (demodulation reference signal, DM-RS for short), so as to increase a data or DM-RS transmission rate. When a base station is used as a transmit end for a signal, and user equipment is used as a receive end, the base station needs to obtain channel information. A precoding matrix indicator PMI may be used as such a type of information, and fed back by the user equipment to the base station device.

Determining a PMI by user equipment is usually a reference signal measurement process. Generally, there are a plurality of types of reference signals. Channel state information may be measured by using a channel state information-reference signal CSI-RS, or may be measured by using another reference signal, another signal, or a combination of various types of signals. A base station and a user terminal may also have a plurality of specific measurement processes. One manner is traversal. For example, the base station determines all possible precoding matrices, precodes reference signals on a plurality of ports by using the precoding matrices, and sends the precoded reference signals to the user equipment. The user equipment receives the reference signals corresponding to the precoding matrices, determines one or more best measurement results by calculating a signal-to-noise ratio or another parameter, determines an index corresponding to the precoding matrix, and reports the index or a PMI corresponding to the index to the base station. It should be understood that the reference signals corresponding to the precoding matrices may be a plurality of reference signals, or may be a plurality of parts of a reference signal. Another specific measurement process may be that the base station directly sends reference signals on a plurality of ports that are not precoded to the user equipment. The user equipment measures channel state information, determines a best precoding matrix with reference to a data transmission scheme used by the base station when sending data to the user equipment subsequently, and reports an index corresponding to the precoding matrix, namely, a PMI to the base station.

After receiving the PMI, the base station may determine a precoding matrix for downlink data or a DM-RS based on the PMI, or may precode downlink data or a DM-RS without using the PMI. Usually, whether the base station uses the PMI reported by the user equipment may depend on a system or a scenario. However, the base station usually receives the PMI before precoding the data and the DM-RS, so as to provide a reference for the base station to determine a precoding matrix.

An embodiment of the present invention provides a scheme for transmit diversity-based data transmission. For example, in a transmit diversity scheme based on space frequency block coding (SFBC), a base station maps data to two ports and encodes a data signal into a signal matrix by using an Alamouti (Alamouti) coding scheme. For example, a structure of the signal matrix is $$\begin{bmatrix} s_1 & s_2 \\ -s_2^* & s_1^* \end{bmatrix},$$

where $S_1$ is a first part of a to-be-sent signal, $S_2$ is a second part of the to-be-sent signal, and * is a conjugate symbol. The data sent on a first antenna port is in a first row of the signal matrix, and the data sent on the second antenna port is in a second row of the signal matrix. The base station sends a first column of the signal matrix on a first subcarrier, and sends a second column of the signal matrix on a second subcarrier. It should be understood that a transformation form of the signal matrix is not limited in this embodiment. For example, the data sent on the first antenna port may be in the first row and/or the second row in reverse order. Alternatively, the data sent on the first port may be $S_1$ and $S_2$ in the signal matrix that are switched in order, or the data sent on the second port may be $-S_2^*$ and $S_1^*$ in the signal matrix that are switched in order. However, regardless of which form is to be used, the base station and the user equipment should use a uniform transformation manner, so that the user equipment can decode and restore data or a DM-RS after the data or the DM-RS is sent. To estimate channels corresponding to the two ports for data demodulation, the base station further sends DMRSs on the first antenna port and the second antenna port. Based on a channel model of MIMO, a data symbol received by the UE on the first subcarrier and the second subcarrier is:

$$[y_1, y_2] = [h_a, h_b]\begin{bmatrix} s_1 & s_2 \\ -s_2^* & s_1^* \end{bmatrix} + [n_1, n_2]$$

$h_a$ is a coefficient of a downlink equivalent channel from the first antenna port of the base station to the user equipment, and $h_b$ is a coefficient of a downlink equivalent channel from the second antenna port of the base station to the user equipment. Herein, it is assumed that channel coefficients of the two ports on the first subcarrier and the second subcarrier are the same. $n_1$ is noise received by the user equipment on the first subcarrier, and $n_2$ is noise received by the user equipment on the second subcarrier. $h_a$ is determined by both a precoding matrix and a downlink channel between the first antenna port and the user equipment, and $h_b$ is determined by both a precoding matrix and a downlink channel between the second antenna port and the user equipment. Before receiving the signal, the UE needs to measure a reference signal and feed back a PMI.

The following further describes a structure of a precoding matrix determined by the UE and a method for determining the precoding matrix by the UE.

The UE receives signaling sent by the base station, where the signaling is used to instruct to feed back transmit diversity-based channel state information. There may be a plurality of forms of instructing to feed back transmit diversity-based channel state information. In an embodiment, the UE may receive an implicit feedback sent by the base station, for example, a trigger message sent by the base station. The base station is instructed, by triggering a procedure, to feed back the channel state information in a step of the procedure. Alternatively, the UE may directly receive a piece of signaling or an indication. For example, when the UE receives the signaling or determines that a field of the signaling meets a preset condition, the UE determines to feed back the transmit diversity-based channel state information. With reference to the embodiment described above, the signaling may be a piece of control information, indication information, or trigger information, or the signaling may be a piece of data in some cases.

The UE sends feedback information to the base station, where the feedback information includes precoding indication information PMI, the PMI is used to indicate a precoding matrix in a precoding matrix set, and a structure of the precoding matrix includes at least one of $$\begin{bmatrix} W_1 & 0 \\ 0 & W_2 \end{bmatrix}$$

and $$\begin{bmatrix} W_1 & W_2 \\ \varphi W_1 & -\varphi W_2 \end{bmatrix},$$

where $W_1$ and $W_2$ are different vectors, and $\varphi$ is a phase factor.

The UE may send the feedback information to the base station in a plurality of manners. In an embodiment of the present invention, the UE may send the feedback information based on history information. The history information may be a prestored field, including transmit diversity-based channel state information previously stored by the UE. The history information may be stored during communication with a previous base station or may be transmit diversity-based channel state information stored the last time before a power supply is turned off. The history information may include the PMI, and the UE determines the PMI included in the feedback information based on the PMI included in the history information. Alternatively, the UE may determine the channel state information in transmit diversity based on channel state information of non-transmit diversity to provide an estimated value. An advantage of the foregoing embodiment is that the feedback information, including the PMI, can be sent at a relatively high response speed. In another embodiment of the present invention, the UE receives and measures a reference signal to determine a precoding matrix indicator PMI. The PMI is used to indicate a precoding matrix in a precoding matrix set, and a structure of the precoding matrix includes at least one of $$\begin{bmatrix} W_1 & 0 \\ 0 & W_2 \end{bmatrix}$$

and $$\begin{bmatrix} W_1 & W_2 \\ \varphi W_1 & -\varphi W_2 \end{bmatrix},$$

where $W_1$ and $W_2$ are different vectors, and $\varphi$ is a phase factor.

According to the foregoing embodiment, because the structure of the precoding matrix is formed based on the different precoding vectors $W_1$ and $W_2$, that is, the different ports are obtained through weighting by using the different precoding vectors, directions of beams corresponding to the two ports are different. Therefore, a probability that when one beam is blocked, the other beam is also blocked can be reduced, and a probability that signals on both of the ports in transmit diversity cannot be received can be reduced, so as to improve performance of transmit diversity-based transmission.

It should be understood that the PMI may be fed back in a plurality of manners. For example, the PMI directly indicates a number of the determined precoding matrix in the precoding matrix set. In another embodiment, the PMI includes a first PMI and a second PMI, the first PMI and the second PMI are used to jointly indicate the precoding matrix in the precoding matrix set, the first PMI is used to indicate a column vector set, and the second PMI is used to indicate a first column vector and a second column vector in the column vector set. Specifically, the precoding matrix set may be represented by vectors. For example, the base station determines the two vectors $W_1$ and $W_2$ jointly indicated by the first PMI and the second PMI, and the base station determines that the structure of the precoding matrix is $$\begin{bmatrix} W_1 & 0 \\ 0 & W_2 \end{bmatrix}.$$

In this case, the base station may determine the precoding matrix based on $W_1$ and $W_2$. It should be understood that the structure of the precoding matrix includes at least one of $$\begin{bmatrix} W_1 & 0 \\ 0 & W_2 \end{bmatrix}$$

and $$\begin{bmatrix} W_1 & W_2 \\ \varphi W_1 & -\varphi W_2 \end{bmatrix}$$

and may have a plurality of implementations. For ease of description, $$\begin{bmatrix} W_1 & 0 \\ 0 & W_2 \end{bmatrix}$$

is a first structure, and $$\begin{bmatrix} W_1 & W_2 \\ \varphi W_1 & -\varphi W_2 \end{bmatrix}$$

is a second structure. The structure of the precoding matrix may include only the first structure but not include the second structure, or may include only the second structure but not include the first structure, or may include both the two structures. It should be understood that, in any one of the foregoing cases, the structure of the precoding matrix may include only the first structure, or include only the second structure, or include only the first structure and the second structure, or include another structure. If two or more structures are included, when the UE indicates the precoding matrix by using the PMI, a structure indication field may be included. However, in some feedback manners, for example, if the number of the precoding matrix is directly fed back, the structure indication field may not be included. Alternatively, the structure of the precoding matrix may be implicitly fed back. For example, value fields of some PMIs indicate the structure.

In an example, a column vector set includes a plurality of column vectors, and column vectors included in a plurality of column vector sets may form the parts $W_1$ and $W_2$ of each precoding matrix in the precoding matrix set. The PMI indicates the first column vector and the second column vector. Specifically, the first PMI is used to indicate the column vector set, and the second PMI is used to indicate the first column vector and the second column vector in the column vector set. In a specific example, it is assumed that all elements in the preceding matrix set are in the first structure, and there are a total of 16 elements to form the parts $W_1$ and $W_2$ of each precoding matrix in the precoding matrix set: w0, w1, . . . , and w15. A combination of two of the 16 elements constitutes $$\begin{bmatrix} W_1 & 0 \\ 0 & W_2 \end{bmatrix},$$

and when $W_1$ is not equal to $W_2$, there are 16×15=240 combinations. In other words, when the structure includes only $$\begin{bmatrix} W_1 & 0 \\ 0 & W_2 \end{bmatrix},$$

the precoding matrix set may include 240 precoding matrices. Certainly, during design, the precoding matrix set may have fewer than 240 precoding matrices under another constraint. For example, the constraint may be that $W_1$ and $W_2$ are elements in a same column vector set. Under the constraint, if the 16 elements are grouped into four column vector sets, which are respectively: a column vector set 1 including w0, w1, w2, and w3; a column vector set 2 including w4, w5, w6, and w7; a column vector set 3 including w8, w9, w10, and w11; and a column vector set 4 including w12, w13, w14, and w15, the foregoing condition constrains a selection result, and both $W_1$ and $W_2$ need to be determined from one of the four column vector sets. In an embodiment, the $PMI_1$ directly indicates one of the four column vector sets. For example, the $PMI_1$ indicates the column vector set 3. The $PMI_2$ indicates a first column vector and a second vector set in the column vector set 3. For example, the $PMI_2$ indicates that $W_1$ is w10, and $W_2$ is w8. In this case, a precoding matrix indicated by the PMI is $$\begin{bmatrix} w10 & 0 \\ 0 & w8 \end{bmatrix}.$$

It should be understood that the grouping manner may be evenly allocating a quantity based on an order, or may be determined based on the vectors. In an embodiment, the column vector sets may be grouped based on frequency characteristics of the signal.

In an optional embodiment, the first column vector indicates a $K^{th}$ column in the column vector set, the second column vector indicates an $L^{th}$ column in the column vector set, and K and L meet a first preset condition. It should be understood that in this embodiment of the present invention, the column vector set may have a definite order relationship. For example, the column vector set includes a column vector of a matrix, and an $s^{th}$ column of the matrix may be an $s^{th}$ column of the column vector set. In another example, T elements in a column vector set may be identified by a general expression. The general expression may include a function s that represents a serial number or a sequence number, for example, $\alpha_s = \alpha(s)$ or $\alpha_s = \alpha(s-1)$, and an $s^{th}$ column of the column vector is an $s^{th}$ column of the column vector set. Alternatively, the UE and the base station negotiate or predefine that an element in the column vector is an $L^{th}$ column. The preset condition may be determined based on physical meanings of K and L. In an embodiment, the first preset condition is that an absolute value of a difference between K and L is greater than or equal to n, K and L are positive integers, and a value of n is greater than or equal to 1. Alternatively, the first preset condition may be that an absolute value of a difference between K and L is less than or equal to a preset value or a preset function.

With reference to the foregoing embodiments, the following describes a manner of feeding back the PMI based on an arrangement sequence or indexes of the column vectors. In a possible implementation, $W_1$ is a column of a discrete Fourier transform (DFT) matrix, and $W_2$ is another column of the discrete Fourier transform matrix. A structure of the discrete Fourier transform matrix may be expressed as:

$$M_{dft} = \frac{1}{\sqrt{N}} \begin{bmatrix} 1 & 1 & 1 & 1 & \ldots & 1 \\ 1 & \omega & \omega^2 & \omega^3 & \ldots & \omega^{N-1} \\ 1 & \omega^2 & \omega^4 & \omega^6 & \ldots & \omega^{2(N-1)} \\ 1 & \omega^3 & \omega^6 & w^9 & \ldots & \omega^{3(N-1)} \\ \vdots & \vdots & \vdots & \vdots & & \vdots \\ 1 & \omega^{N-1} & \omega^{2(N-1)} & \omega^{3(N-1)} & \ldots & \omega^{(N-1)(N-1)} \end{bmatrix} \quad (1)$$

A value of N is an order of the DFT matrix. In an embodiment, a value of $\omega$ may be $$\omega = e^{j\frac{2\pi}{N}}.$$

In another embodiment, a value of $\omega$ may be $$\omega = e^{j\frac{2\pi}{NO}},$$

and O≥1 is an oversampling factor. In an embodiment, the base station may store or configure a codebook set in advance, and the codebook set includes a discrete Fourier transform matrix. According to this embodiment, if the first precoding vector is an $i^{th}$ column of the discrete Fourier transform matrix, the first precoding vector is:

$$\frac{1}{\sqrt{N}} \begin{bmatrix} 1 \\ \omega^{i-1} \\ \vdots \\ \omega^{(i-1)(N-2)} \\ \omega^{(i-1)(N-1)} \end{bmatrix}$$

Likewise, if the second precoding vector is a $j^{th}$ column (i is not equal to j) of the discrete Fourier transform matrix, the second precoding vector is:

$$\frac{1}{\sqrt{N}} \begin{bmatrix} 1 \\ \omega^{j-1} \\ \vdots \\ \omega^{(j-1)(N-2)} \\ \omega^{(j-1)(N-1)} \end{bmatrix}$$

It should be understood that in this embodiment of the present invention, that the first precoding vector is a column of the discrete Fourier transform matrix, and the second precoding vector is another column of the discrete Fourier transform matrix may be a representation manner. A specific form of the precoding vector may be an array or a sequence. Terms in the array or sequence meet an arrangement rule of a column of the discrete Fourier transform matrix to some extent. In a possible representation manner, the first precoding vector and the second precoding vector meet the following formula, and values of p of the first precoding vector and the second precoding vector are not equal:

$$\frac{1}{\sqrt{N}} \begin{bmatrix} 1 \\ \omega^{p-1} \\ \vdots \\ \omega^{(p-1)(N-2)} \\ \omega^{(p-1)(N-1)} \end{bmatrix}$$

A value of $\omega$ is $$\omega = e^{j\frac{2\pi}{N}},$$

and p is an integer. Alternatively, $$\omega = e^{j\frac{2\pi}{NO}},$$

and O>1 is an oversampling factor. This embodiment describes a manner of direct calculation based on a parameter p.

In another possible design, the first precoding vector is a $K^{th}$ column of the discrete Fourier transform matrix, and the second precoding vector is an $L^{th}$ column of the discrete Fourier transform matrix, where an absolute value of a difference between K and L is greater than or equal to n, and n is a predefined value, or n is a value notified by the base station to the UE by using signaling. For example, the first precoding vector $W_1$ and the second precoding vector $W_2$ are respectively:

$$W_1 = \frac{1}{\sqrt{N}} \begin{bmatrix} 1 \\ \omega^{L-1} \\ \vdots \\ \omega^{(L-1)(N-2)} \\ \omega^{(L-1)(N-1)} \end{bmatrix} \text{ and } W_2 = \frac{1}{\sqrt{N}} \begin{bmatrix} 1 \\ \omega^{K-1} \\ \vdots \\ \omega^{(K-1)(N-2)} \\ \omega^{(K-1)(N-1)} \end{bmatrix}$$

where $|K-L| \geq n$.

The value of n is greater than 1. In this case, an interval between the first precoding matrix and a second precoding matrix increases, so that an interval between directions of beams corresponding to two ports of SFBC can be increased. To be specific, a larger n indicates that the directions of the beams corresponding to the two ports are more different. A probability that when one beam is blocked, the other beam is also blocked can be reduced, and a probability that signals on both of the ports in transmit diversity cannot be received can be reduced, so as to improve performance of transmit diversity-based transmission. Optionally, the value of n is a predefined value and is prestored in the user equipment and the base station, or configured by the base station for the user equipment by using signaling or a message.

Data sent on a first antenna port in the signal matrix is precoded by using a column of the precoding matrix, and data sent on a second antenna port in a signal matrix is precoded by using another column of the precoding matrix.

The following specifically describes a manner in which the user equipment determines and feeds back the PMI based on measurement, and a form in which the user equipment indicates the precoding matrix. This application describes some implementations one by one, but this does not limit another manner in which the user equipment feeds back the PMI.

There may be a plurality of PMI feedback manners. In an embodiment, the PMI includes a first PMI and a second PMI, the first PMI and the second PMI are used to jointly indicate the precoding matrix in the precoding matrix set, the first PMI is used to indicate a column vector set, and the second PMI is used to indicate a first column vector and a second column vector in the column vector set.

PMI Feedback Scheme 1:

The first PMI is used to indicate a column vector set, and the column vector set is a set including columns of the discrete Fourier transform matrix. The second PMI is used to indicate two columns in the column vector set, and the two column vectors indicated by the second PMI are the first precoding vector and the second precoding vector.

The UE sends the PMI to the base station. The PMI includes the first PMI and the second PMI, and the first PMI and the second PMI are used to jointly indicate the precoding matrix. For example, an order of the discrete Fourier transform matrix is 16, and therefore a value of N is 16. The base station and the user equipment may specify four groups: the first to fourth columns, the fifth to eighth columns, the ninth to twelfth columns, and the thirteenth and sixteenth columns, and each group is a set including corresponding elements. For example, a first group is the first to fourth columns of the discrete Fourier transform matrix:

$$\frac{1}{\sqrt{N}}\begin{bmatrix}1\\1\\\vdots\\1\\1\end{bmatrix}, \frac{1}{\sqrt{N}}\begin{bmatrix}1\\\omega\\\vdots\\\omega^{14}\\\omega^{15}\end{bmatrix}, \frac{1}{\sqrt{N}}\begin{bmatrix}1\\\omega^2\\\vdots\\\omega^{28}\\\omega^{30}\end{bmatrix}, \text{and } \frac{1}{\sqrt{N}}\begin{bmatrix}1\\\omega^3\\\vdots\\\omega^{42}\\\omega^{45}\end{bmatrix}$$

If the first PMI is represented by $PMI_1$, an index number corresponding to the first PMI may be represented by $PMI_1=0$, and the foregoing grouping relationship may be represented by values of the first PMI in the four columns.

| Set | First to fourth columns | Fifth to eighth columns | Ninth to twelfth columns | Thirteenth to sixteenth columns |
|---|---|---|---|---|
| $PMI_1$ | 0 | 1 | 2 | 3 |

If n=2, in the first group, available combinations of the first precoding vector and the second precoding vector may be {first column, third column}, {second column, fourth column}, {first column, fourth column}, {third column, first column}, {fourth column, second column}, and {fourth column, first column}. The combinations of the first and second precoding vectors may be represented by six values of the second PMI, for example:

| Combinations | {1, 3} | {2, 4} | {1, 4} | {3, 1} | {4, 2} | {4, 1} |
|---|---|---|---|---|---|---|
| $PMI_2$ | 0 | 1 | 2 | 3 | 4 | 5 |

For example, if the UE determines that the value of the $PMI_1$ is 0, and the value of the $PMI_2$ is 3, the first precoding vector $W_1$ and the second precoding vector $W_2$ are:

$$W_1 = \frac{1}{\sqrt{N}}\begin{bmatrix}1\\\omega^2\\\vdots\\\omega^{28}\\\omega^{30}\end{bmatrix} \text{ and } W_2 = \frac{1}{\sqrt{N}}\begin{bmatrix}1\\1\\\vdots\\1\\1\end{bmatrix}$$

According to the foregoing implementation, a feedback manner in a case of n=2 and N=16 may be obtained:

| $PMI_1 = 0$ | {1, 3} | {2, 4} | {1, 4} | {3, 1} | {4, 2} | {4, 1} |
|---|---|---|---|---|---|---|
| $PMI_1 = 1$ | {5, 7} | {6, 8} | {5, 8} | {7, 5} | {8, 6} | {8, 5} |
| $PMI_1 = 2$ | {9, 11} | {10, 12} | {9, 12} | {11, 9} | {12, 10} | {12, 9} |
| $PMI_1 = 3$ | {13, 15} | {14, 16} | {13, 16} | {15, 13} | {16, 14} | {16, 13} |
| | $PMI_2 = 0$ | $PMI_2 = 1$ | $PMI_2 = 2$ | $PMI_2 = 3$ | $PMI_2 = 4$ | $PMI_2 = 5$ |

For example, if the UE determines that $PMI_1=3$ and $PMI_2=1$, corresponding to {14, 16} in the table, the first precoding matrix is the fourteenth column of the discrete Fourier transform matrix, and the second precoding matrix is the sixteenth column of the discrete Fourier transform matrix. It should be understood that alternatively, it may be directly determined, based on $PMI_1=3$ and $PMI_2=1$, that a parameter p of the first precoding matrix is 14, and a parameter p of the second precoding matrix is 16, so as to directly calculate the precoding matrix. A calculation manner is corresponding to the manner of calculation based on p in the foregoing embodiment. To be specific, the user equipment reports $PMI_1=3$ and $PMI_2=1$, and the base station directly determines the first precoding vector and the second precoding matrix based on a mapping relationship or by directly substituting p=14 and p=16 into the following formula separately based on the following formula:

$$\frac{1}{\sqrt{N}}\begin{bmatrix}1\\\omega^{p-1}\\\vdots\\\omega^{(p-1)(N-2)}\\\omega^{(p-1)(N-1)}\end{bmatrix}$$

In another embodiment, a structure of the discrete Fourier transform matrix may be represented by a Kronecker (Kronecker) product of a transform matrix in a horizontal direction and a transform matrix in a vertical direction, and the transform matrix in each direction is a product of a diagonal matrix and a discrete Fourier transform matrix:

$$M_{k_1,k_2} = \left(D_{N_1}^{k_1} F_{N_1}\right) \otimes \left(D_{N_2}^{k_2} F_{N_2}\right) \quad (2)$$

A diagonal matrix $$D_N^k = \text{diag}\left[e^{j2\pi \frac{k}{ON} 0} \; e^{j2\pi \frac{k}{ON} 1} \; \ldots \; e^{j2\pi \frac{k}{ON} (N-1)}\right],$$

O>1 is an oversampling factor, and a value of O is a non-zero integer. $F_N$ is a discrete Fourier transform matrix having a form shown in the expression (1). $N_1$ and $N_2$ are respectively quantities of antenna ports in the horizontal direction and the vertical direction.

Based on the structure of the discrete Fourier transform matrix shown in (2), the base station may store or configure a codebook set in advance, the codebook set includes at least one discrete Fourier transform matrix having the form (2), and parameters $k_1$ and $k_2$ of each discrete Fourier transform matrix in the codebook set are different.

A manner in which the UE feeds back the PMI is similar to that of the previous embodiment. A $PMI_1$ is used to instruct the base station to select a group of column vectors by selecting parameters ($k_1$, $k_2$), and a $PMI_2$ is used to instruct the base station to select two column vectors in the group of column vectors, so as to determine the first precoding vector and the second precoding vector. For example, ($k_1$, $k_2$) have four values in total: (0, 0), (0, 1), (1, 0), and (1, 1), and the value of the $PMI_1$ may be 0, 1, 2, 3. Each $PMI_1$ is corresponding to one $$D_{N_1}^{k_1}$$

and one $$D_{N_2}^{k_2},$$

and a corresponding group of column vectors may be obtained based on the expression (2).

| Set | Set including column vectors of $M_{0,0}$ | Set including column vectors of $M_{0,1}$ | Set including column vectors of $M_{1,0}$ | Set including column vectors of $M_{1,1}$ |
|---|---|---|---|---|
| $PMI_1$ | 0 | 1 | 2 | 3 |

The $PMI_2$ is used to instruct to select a $K^{th}$ column and an $L^{th}$ column from the group of column vectors selected based on the $PMI_1$. A manner is similar to that of the foregoing embodiment, and details are not described again. Based on the $PMI_1$ and $PMI_2$, the user equipment may instruct the base station to determine the first precoding vector and the second precoding vector.

In another embodiment, a structure of the discrete Fourier transform matrix may also be expressed as:

$$M_{(k_1,k_2,k_1',k_2')} = \begin{bmatrix} (D_{N_1}^{k_1}F_{N_1}) \otimes (D_{N_2}^{k_2}F_{N_2}) & 0 \\ 0 & (D_{N_1}^{k_1'}F_{N_1}) \otimes (D_{N_2}^{k_2'}F_{N_2}) \end{bmatrix} \quad (3)$$

$$(D_{N_1}^{k_1}F_{N_1}) \otimes (D_{N_2}^{k_2}F_{N_2})$$

is a discrete Fourier transform matrix for an antenna in a first polarization direction, and $$(D_{N_1}^{k_1'}F_{N_1}) \otimes (D_{N_2}^{k_2'}F_{N_2})$$

is a discrete Fourier transform matrix for an antenna in a second polarization direction. A form of a diagonal matrix $D_N^k$ is still $$D_N^k = \mathrm{diag}\left[e^{j2\pi\frac{k}{ON}0} e^{j2\pi\frac{k}{ON}1} \ldots e^{j2\pi\frac{k}{ON}(N-1)}\right],$$

where O>1 is an oversampling factor, and a value of O is a non-zero integer. $F_N$ is a discrete Fourier transform matrix having a form shown in the expression (1). $N_1$ and $N_2$ are respectively quantities of antenna ports in the horizontal direction and the vertical direction.

Based on the structure of the discrete Fourier transform matrix shown in (3), the base station may store or configure a codebook set in advance, the codebook set includes at least one discrete Fourier transform matrix having the form (3), and parameters $k_1$ and $k_2$, or $k_1'$ and $k_2'$ of each discrete Fourier transform matrix in the codebook set are different.

A manner in which the UE feeds back the PMI is different from the previous embodiment. A $PMI_1$ is used to instruct the base station to select a group of column vectors for each of the antenna in the first polarization direction and the antenna in the second polarization direction by selecting parameters ($k_1$, $k_2$) and ($k_1'$, $k_2'$). For example, ($k_1$, $k_2$) and ($k_1'$, $k_2'$) each have four values: (0, 0), (0, 1), (1, 0), and (1, 1), and a value of the $PMI_1$ may be any integer from 0 to 15. Each $PMI_1$ is corresponding to one $$\left(D_{N_1}^{k_1}, D_{N_2}^{k_2}, D_{N_1}^{k_1'}, D_{N_2}^{k_2'}\right),$$

and the two groups of column vectors corresponding to the antennas in the two polarization directions may be obtained based on the expression (3). After the $PMI_1$ is determined, a $PMI_2$ is used to instruct the base station to select a column vector from each of the two groups of column vectors, so as to determine the first precoding vector and the second precoding vector. A specific manner of selecting the two column vectors by using the $PMI_2$ is similar to that of the foregoing embodiment, and details are not described again.

The structure of the discrete Fourier transform matrix may have another form. For example, the discrete Fourier transform matrix M may further be an oversampled discrete Fourier transform matrix. This is not limited herein.

Implementation 2:

When receiving, by the user equipment UE, a reference signal sent by the base station includes receiving, by the UE, M reference signals sent by the base station through M antenna ports, Implementation 2 may be used. The M reference signals are respectively associated with precoding vectors, where M is an integer greater than or equal to 2. "Associated" herein may mean that each reference signal is a reference signal precoded by using a precoding vector corresponding to the reference signal, and the precoding vector is a precoding vector of the port through which the reference signal is sent. In this case, the PMI is used to indicate two antenna ports in the M antenna ports, an interval between port numbers of the two antenna ports is n, and the value of n is greater than or equal to 1. For example, when there are four ports, the base station sends reference signals to the UE through four antenna ports: a port 0, a port 1, a port 2, and a port 3. The port 0 and the port 1 are a first port and a second port of the antenna in a first polarization direction, and the port 2 and the port 3 are a first port and a second port of the antenna in a second polarization direction. The port 0 and the port 2 each use a precoding matrix $W_{a1}$ to encode the reference signals, and the port 1 and the port 3 each use a precoding matrix $W_{b1}$ to encode the reference signals. After receiving the reference signals corresponding to the port 0, the port 1, the port 2, and the port 3, the UE may directly measure the reference signals on the four antenna ports and determine an optimal antenna port in the first polarization direction and an optimal antenna port in the second polarization direction. An interval between port numbers of the two antenna ports is 1. To be specific, the UE determines the optimal antenna ports from {port 0, port 3} and {port 1, port2} and feeds back a PMI. The PMI may be an indication of a port number. The base station may determine a precoding vector of a port based on a port number of the port. For example, the PMI that is fed back indicates port numbers {port 1, port 2}. Therefore, the base station determines that the precoding vectors are $W_{b1}$ and $W_{a1}$. In other words, the M reference signals are associated with the precoding vectors. Usually, there is no sequence between the determined results, because the UE does not feed back the results based on a sequence. In this way, channel resources can be saved. However, the UE may alternatively feed back the results based on a sequence, and an advantage is that the fed back results are more accurate. For example, the UE determines that {port 0, port 2} are two optimal antenna ports, and the port 2 is better than the port 0. The UE may feed back a PMI representing {port 2, port 0}, to indicate that the port 2 is better than the port 0.

The PMI may be a third PMI, and the third PMI is used to indicate two antenna ports in the M antenna ports. Precoding vectors of the two antenna ports indicated by the third PMI are the first precoding vector and the second precoding vector.

In a specific example of feeding back the third PMI, if the base station sends reference signals on eight antenna ports, and sends reference signals on four antenna ports on antennas in each polarization direction, the UE may measure the reference signals on the four antenna ports in each polarization direction, and select one antenna port from the four antenna ports in each polarization direction. A port may be selected by using a precoding matrix. The precoding matrix is a matrix in a precoding matrix set, and has a form of $$\begin{bmatrix} W_1 & 0 \\ 0 & W_2 \end{bmatrix}$$

or $$\begin{bmatrix} W_1 & W_2 \\ \varphi W_1 & -\varphi W_2 \end{bmatrix},$$

where $W_1=e_i$ and $W_2=e_j$, $e_i$ is a column vector with dimensions 4*1, in which an $i^{th}$ element is 1, and other elements are 0. $W_1=e_i$ indicates that for the antennas in the first polarization direction, the UE selects an port (i=1, 2, 3, or 4). $W_2=e_j$ indicates that for the antennas in the second polarization direction, the UE selects a $j^{th}$ port (j=1, 2, 3, or 4). In this embodiment, i is not equal to j, or |i−j|≥n, where n is a number greater than or equal to 1. Under a constraint that i is not equal to j, there are 4*3 combinations of two ports selected by the UE in total, and therefore, the third PMI may have 12 values. Alternatively, when there is another constraint, the third PMI has fewer than 12 values. The UE indicates the two selected ports by reporting the third PMI.

The following describes another specific embodiment. When sending the reference signals to the UE, the base station sends one reference signal on each port, where the reference signal on each port may be obtained through precoding by using a precoding matrix. In an embodiment, a reference signal on the port $P_x$ is obtained through precoding by using a precoding matrix $W_x$. There are 16 such ports in total, and a value range of x is from 0 to 15. The UE determines, by measuring an encoded reference signal sent on each port, an antenna port with best channel quality (for example, two antenna ports with highest power, or two antenna ports with optimal SNRs) or a port determined based on another predefined rule from the antenna ports in each polarization direction, and feeds back a PMI based on an index corresponding to a combination of the selected ports in the two polarization directions. For example, a port 2 in the first polarization direction is selected, and a port 5 in the second polarization direction is selected. In this case, a corresponding PMI index value is 8, and the user equipment directly feeds back $PMI_3=8$ to the base station. In another embodiment, the $PMI_3$ may be two PMIs used to separately feed back port selection in the first polarization direction and port selection in the second polarization direction.

According to the foregoing implementations, the following problem can be resolved: the PMI fed back by the UE indicates that beams corresponding to two ports of SFBC are basically consistent in direction. Further, the user equipment obtains a precoding matrix based on different precoding vectors, and can obtain a beamforming gain generated when all antenna ports in two polarization directions are used for precoding.

The following specifically describes a process in which the base station determines the precoding matrix and subsequent steps. It should be understood that the process in which the base station determines the precoding matrix and the subsequent steps may be used in combination with the foregoing embodiments in which the UE measures and feeds back the PMI, or may be performed alone.

The base station selects a precoding matrix from a precoding matrix set, where a structure of the precoding matrix includes at least one of $$\begin{bmatrix} W_1 & 0 \\ 0 & W_2 \end{bmatrix}$$

and $$\begin{bmatrix} W_1 & W_2 \\ \varphi W_1 & -\varphi W_2 \end{bmatrix},$$

$W_1$ and $W_2$ are different vectors, $\varphi$ is a phase factor, and the precoding matrix is used for transmit diversity-based data transmission. The base station precodes a to-be-sent signal by using the selected precoding matrix.

The base station may determine the precoding matrix in a plurality of manners. For example, the base station may determine the precoding matrix based on a current channel state or history information, or by receiving a configuration of an access network network element or a core network network element on a network side. This is not limited in the present invention. In an embodiment, the base station sends signaling to the user equipment UE, where the signaling is used to instruct to feed back transmit diversity-based channel state information. The channel state information may include a PMI. In an embodiment, the base station receives a precoding matrix indicator PMI sent by the UE, the PMI is used to indicate the precoding matrix, and the structure of the precoding matrix includes at least one of $$\begin{bmatrix} W_1 & 0 \\ 0 & W_2 \end{bmatrix}$$

and $$\begin{bmatrix} W_1 & W_2 \\ \varphi W_1 & -\varphi W_2 \end{bmatrix},$$

where $W_1$ and $W_2$ are different vectors, and $\varphi$ is a phase factor. In an embodiment, the base station determines M reference signals, where each reference signal is a reference signal precoded by using a precoding vector, and the precoding vector is a precoding vector of the port through which the reference signal is sent; and the base station sends the M reference signals through M antenna ports. In another embodiment, the base station directly specifies two antenna ports in a plurality of antenna ports, and sends, through the two antenna ports, reference signals precoded by using different precoding matrices.

The received PMI may be a reference value of a channel. The base station may determine, based on a situation, whether to use the PMI to determine the precoding matrix. In an embodiment, the base station determines the precoding matrix based on the PMI information. For example, the PMI is used to indicate $W_1$ and $W_2$, and the base station determines the precoding matrix based on $W_1$ and $W_2$. The PMI includes a first PMI and a second PMI, the first PMI and the second PMI are used to jointly indicate the precoding matrix, the first PMI is used to indicate a column vector set, and the second PMI is used to indicate a first column vector and a second column vector in the column vector set. Further, the first column vector indicates a $K^{th}$ column in the column vector set, and the second column vector indicates an $L^{th}$ column in the column vector set, where an absolute value of a difference between K and L is greater than or equal to n, K and L are positive integers, and a value of n is greater than or equal to 1. In an embodiment, the PMI is used to indicate two antenna ports in M antenna ports of the base station, and an interval between port numbers of the two antenna ports is n, where M is an integer greater than or equal to 2, and the value of n is greater than or equal to 1. The value of n may be determined in different manners. In an example, the value of n is indicated by using the signaling sent by the base station to the UE, or n is a value predefined by the base station and the UE. More specific manners of sending the reference signal and feeding back the PMI have been described in detail in the embodiments and implementations in which the user equipment sends feedback information. Details are not described herein again.

In an embodiment, $W_1$ and $W_2$ are a column and another column in a discrete Fourier transform matrix respectively. It should be understood that determining of the discrete Fourier transform matrix and a definition and form of the column of the discrete Fourier transform matrix have been described in the foregoing embodiments. Details are not described herein again.

The base station may perform layer mapping on a to-be-sent signal, to obtain a signal matrix. In an embodiment, the precoding matrix is used to precode a signal matrix, where a structure of the signal matrix is $$\begin{bmatrix} S_1 & S_2 \\ -S_2^* & S_1^* \end{bmatrix},$$

where $S_1$ is a first part of the to-be-sent signal, $S_2$ is a second part of the to-be-sent signal, and * is a conjugate symbol. There may be a plurality of specific layer mapping manners, and this is not limited in the present invention. An implementation may be that the base station integrates, adds zeros to, splits, or performs various preset transformations on different data to obtain the to-be-sent signal, and divides the to-be-sent signal into the first part and the second part. There may be a plurality of specific division manners, for example, directly truncating the to-be-sent signal in equal proportion, dividing the to-be-sent signal into the first part and the second part through interleaving, or performing redundancy coding on the to-be-sent signal. The signal matrix is a representation manner, which may be specifically in a form of a vector or a determinant. An identification manner of the signal matrix may be different, and a manner in which the signal matrix is mapped to an antenna port for sending may also be different. For example, data sent by the base station on a first antenna port is in a first row of the signal matrix, and data sent by the base station on a second antenna port is in a second row of the signal matrix.

The base station precodes the first signal matrix based on the precoding matrix and obtains a precoded signal. In an embodiment, the base station precodes, by using a first column of the precoding matrix, the data sent on the first antenna port in the signal matrix, and the base station precodes, by using a second column of the precoding matrix, the data sent on the second antenna port in the signal matrix.

The base station sends the precoded signal. The signal matrix herein may be to-be-sent data or a precoded DM-RS signal, or may be directly a DM-RS signal, or may be a combination of the signals or the data. A signal matrix of the precoded DM-RS signal may use another matrix form, for example, $$\begin{bmatrix} s_1 \\ s_2 \end{bmatrix},$$

where $s_1$ is a DM-RS signal sent on the first antenna port, and $s_2$ is a DM-RS signal sent on the second antenna port. The base station precodes the signal matrix of the DM-RS signal by using the precoding matrix and sends the DMRS. In an embodiment, the base station precodes, by using a column of the precoding matrix, the data sent on the first antenna port in the signal matrix, and precodes, by using another column of the precoding matrix, the data sent on the second antenna port in the signal matrix. In another embodiment, the data sent on the first antenna port is in a row of the signal matrix, and the data sent on the second antenna port is in another row of the signal matrix.

According to the foregoing implementations, the following problem can be resolved: When the base station sends data or a DM-RS reference signal in a downlink manner, beams corresponding to two ports of the base station are basically consistent in direction. Further, the base station obtains a precoding matrix based on different precoding vectors, and a system can obtain a beamforming gain generated when all antenna ports in two polarization directions are used for precoding.

The following describes procedures of the implementations in the embodiments of the present invention with reference to the accompanying drawings. It should be understood that steps in the following procedure embodiments may be combined with the procedures implemented by the user equipment or the base station described above.

Figure 1:
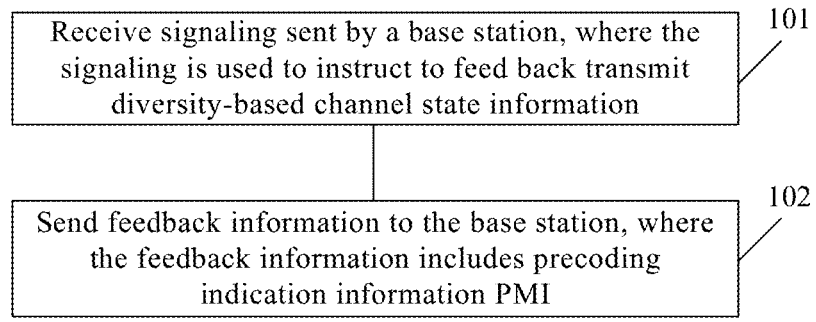
FIG. 1 is a schematic flowchart of a transmit diversity-based data transmission method according to an embodiment of the present invention.

FIG. 1 shows a method embodiment of the present invention. FIG. 1 may be implemented by UE, or a computer storage medium including signaling, and when the storage medium runs on a computer, the methods may be implemented.

Step 101: Receive signaling sent by a base station, where the signaling is used to instruct to feed back transmit diversity-based channel state information.

Step 102: Send feedback information to the base station, where the feedback information includes precoding indication information PMI, the PMI is used to indicate a precoding matrix in a precoding matrix set, and a structure of the precoding matrix includes at least one of $$\begin{bmatrix} W_1 & 0 \\ 0 & W_2 \end{bmatrix}$$

and $$\begin{bmatrix} W_1 & W_2 \\ \varphi W_1 & -\varphi W_2 \end{bmatrix},$$

where $W_1$ and $W_2$ are different vectors, and $\varphi$ is a phase factor.

In an embodiment, the PMI includes a first PMI and a second PMI, the first PMI and the second PMI are used to jointly indicate the precoding matrix in the precoding matrix set, the first PMI is used to indicate a column vector set, and the second PMI is used to indicate a first column vector and a second column vector in the column vector set. In another embodiment, the first column vector indicates a $K^{th}$ column in the column vector set, and the second column vector indicates an $L^{th}$ column in the column vector set, where an absolute value of a difference between K and L is greater than or equal to n. Alternatively, in an embodiment, the difference between K and L may meet a threshold, for example, the threshold is greater than or equal to a value, or is less than or equal to a value, or falls within an interval, where K and L are positive integers, and a value of n is greater than or equal to 1.

In still another embodiment, the step may further include: receiving, by the UE, M reference signals sent by the base station through M antenna ports, where the M reference signals are respectively associated with precoding vectors, and M is an integer greater than or equal to 2, where the PMI is used to indicate two antenna ports in the M antenna ports, an interval between port numbers of the two antenna ports is n, and the value of n is greater than or equal to 1. In an embodiment, the value of n is configured by the base station by using signaling, or n is a predefined value.

According to the foregoing implementations, the following problem can be resolved: When the base station sends data or a DM-RS reference signal in a downlink manner, beams corresponding to two ports of the base station are basically consistent in direction. Further, the base station obtains a precoding matrix based on different precoding vectors, and a system can obtain a beamforming gain generated when all antenna ports in two polarization directions are used for precoding.

Implementations of a form, a feedback manner, and the like of the PMI and an indication manner of the column vectors have been described in the foregoing embodiments. Details are not described herein again.

Figure 2:
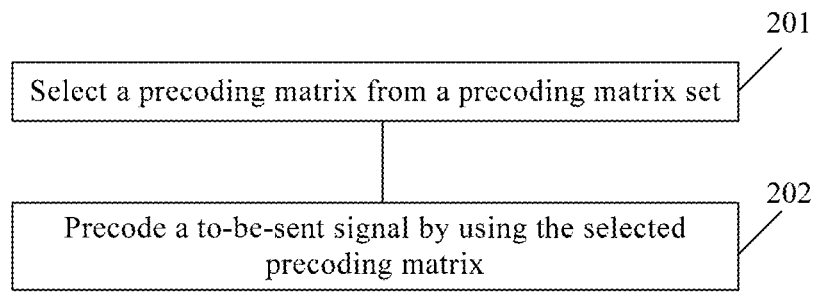
FIG. 2 is a schematic flowchart of a transmit diversity-based data transmission method according to an embodiment of the present invention.

FIG. 2 shows another method embodiment of the present invention. Steps in FIG. 2 may be implemented by a base station, or a computer storage medium including signaling, and when the storage medium runs on a computer, the methods may be implemented.

Step 201: Select a precoding matrix from a precoding matrix set, where a structure of the precoding matrix includes at least one of $$\begin{bmatrix} W_1 & 0 \\ 0 & W_2 \end{bmatrix}$$

and $$\begin{bmatrix} W_1 & W_2 \\ \varphi W_1 & -\varphi W_2 \end{bmatrix},$$

$W_1$ and $W_2$ are different vectors, $\varphi$ is a phase factor, and the precoding matrix is used for transmit diversity-based data transmission.

Step 202: Precode a to-be-sent signal by using the selected precoding matrix.

In an embodiment, the precoding a to-be-sent signal by using the selected precoding matrix includes: precoding a signal matrix by using the precoding matrix, where a structure of the signal matrix is $$\begin{bmatrix} S_1 & S_2 \\ -S_2^* & S_1^* \end{bmatrix},$$

where $S_1$ is a first part of the to-be-sent signal, $S_2$ is a second part of the to-be-sent signal, and * is a conjugate symbol. In another embodiment, data sent on a first antenna port in the signal matrix is precoded by using a column of the precoding matrix, and data sent on a second antenna port in the signal matrix is precoded by using another column of the precoding matrix. In still another embodiment, the data sent on the first antenna port is in a row of the signal matrix, and the data sent on the second antenna port is in another row of the signal matrix.

In yet another embodiment, the base station sends signaling to user equipment UE, where the signaling is used to instruct to feed back transmit diversity-based channel state information.

In still yet another embodiment, the base station receives a precoding matrix indicator PMI sent by the UE, the PMI is used to indicate the precoding matrix, and the structure of the precoding matrix includes at least one of $$\begin{bmatrix} W_1 & 0 \\ 0 & W_2 \end{bmatrix}$$

and $$\begin{bmatrix} W_1 & W_2 \\ \varphi W_1 & -\varphi W_2 \end{bmatrix},$$

where $W_1$ and $W_2$ are different vectors, and $\varphi$ is a phase factor. In an optional implementation, the PMI includes a first PMI and a second PMI, the first PMI and the second PMI are used to jointly indicate the precoding matrix, the first PMI is used to indicate a column vector set, and the second PMI is used to indicate a first column vector and a second column vector in the column vector set. The first column vector indicates a $K^{th}$ column in the column vector set, and the second column vector indicates an $L^{th}$ column in the column vector set, where an absolute value of a difference between K and L is greater than or equal to n, K and L are positive integers, and a value of n is greater than or equal to 1. A relationship of the difference between K and L is described in the embodiment shown in FIG. 1. Details are not described herein again. In another embodiment, the PMI is used to indicate two antenna ports in M antenna ports of the base station, and an interval between port numbers of the two antenna ports is n, where M is an integer greater than or equal to 2, and the value of n is greater than or equal to 1.

Optionally, the value of n is indicated by using the signaling sent to the UE, or n is a predefined value. Implementations of a form, a feedback manner, and the like of the PMI and an indication manner of the column vectors have been described in the foregoing embodiments. Details are not described herein again.

Figure 3:
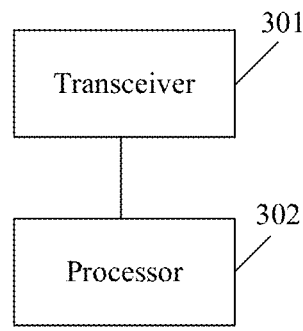
FIG. 3 is a structural diagram of an apparatus for implementing transmit diversity-based data transmission according to an embodiment of the present invention.

FIG. 3 is a structural diagram of a user equipment apparatus according to the present invention. The apparatus includes a transceiver 301 and a processor 302. It should be understood that the transceiver apparatus may be an antenna, or may be integration of a receiver and a transmitter or integration of a receiver circuit and a transmitter circuit. The processor is connected to the transceiver, and the processor may mount a corresponding quantity of memories, or flash memories, or other storage media, or a memory 303 to store data, signaling, and the like.

The transceiver 301 is configured to receive signaling sent by a base station, where the signaling is used to instruct to feed back transmit diversity-based channel state information.

The processor 302 is configured to generate feedback information, where the feedback information includes precoding indication information PMI, the PMI is used to indicate a precoding matrix in a precoding matrix set, and a structure of the precoding matrix includes at least one of $$\begin{bmatrix} W_1 & 0 \\ 0 & W_2 \end{bmatrix}$$

and $$\begin{bmatrix} W_1 & W_2 \\ \varphi W_1 & -\varphi W_2 \end{bmatrix},$$

where $W_1$ and $W_2$ are different vectors, and $\varphi$ is a phase factor.

The transceiver 301 is further configured to send the feedback information to the base station.

The apparatus shown in FIG. 3 may implement steps and solutions in the procedure of the method shown in FIG. 1, or may be combined with the foregoing embodiments to implement sending and receiving, and processing functions. Details are not described herein.

Figure 4:
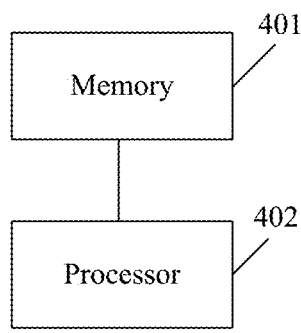
FIG. 4 is a structural diagram of an apparatus for implementing transmit diversity-based data transmission according to an embodiment of the present invention.

FIG. 4 is a structural diagram of a base station apparatus according to the present invention, including a memory 401 and a processor 402.

The processor 402 is configured to select a precoding matrix from a precoding matrix set and precode a to-be-sent signal by using the selected precoding matrix, where a structure of the precoding matrix includes at least one of $$\begin{bmatrix} W_1 & 0 \\ 0 & W_2 \end{bmatrix}$$

and $$\begin{bmatrix} W_1 & W_2 \\ \varphi W_1 & -\varphi W_2 \end{bmatrix},$$

$W_1$ and $W_2$ are different vectors, $\varphi$ is a phase factor, and the precoding matrix is used for transmit diversity-based data transmission. The processor 402 is connected to the memory 401, and the memory 401 is configured to store data, signaling, and the like. In an embodiment, the base station further includes a transceiver, configured to send signaling to user equipment UE, where the signaling is used to instruct to feed back transmit diversity-based channel state information, or implement a function in FIG. 2 of implementing interaction with another apparatus.

The apparatus shown in FIG. 4 may implement steps and solutions in the procedure of the method shown in FIG. 2, or may be combined with the foregoing embodiments to implement sending and receiving, and processing functions. Details are not described herein.

All or some of the foregoing embodiments may be implemented by software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of the present invention are all or partially generated. The computer may be a general-purpose computer, a dedicated computer, a computer network, or another programmable apparatus. The computer instructions may be stored in a computer-readable storage medium or may be transmitted from one computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk Solid State Disk (SSD)), or the like.

What is claimed is:

1. An information feedback method, comprising:
receiving signaling from a base station, wherein the signaling is used to instruct to feed back transmit diversity-based channel state information; and
sending feedback information to the base station, wherein the feedback information comprises precoding matrix indicator (PMI), wherein the PMI is used to indicate a precoding matrix in a precoding matrix set, wherein a structure of the precoding matrix comprises at least one of $$\begin{bmatrix} W_1 & 0 \\ 0 & W_2 \end{bmatrix}$$

and $$\begin{bmatrix} W_1 & W_2 \\ \varphi W_1 & -\varphi W_2 \end{bmatrix},$$

wherein $W_1$ and $W_2$ are different vectors, and wherein $\varphi$ is a phase factor.

2. The method according to claim 1, wherein the PMI comprises a first PMI and a second PMI, wherein the first PMI and the second PMI are used to jointly indicate the precoding matrix in the precoding matrix set, wherein the first PMI is used to indicate a column vector set, and wherein the second PMI is used to indicate a first column vector and a second column vector in the column vector set.

3. The method according to claim 2, wherein the first column vector indicates a $K^{th}$ column in the column vector set, wherein the second column vector indicates an $L^{th}$ column in the column vector set, wherein an absolute value of a difference between K and L is greater than or equal to n, wherein K and L are positive integers, and wherein a value of n is greater than or equal to 1.

4. The method according to claim 1, further comprising:
receiving M reference signals from the base station through M antenna ports, wherein the M reference signals are respectively associated with precoding vectors, wherein M is an integer greater than or equal to 2, wherein the PMI is used to indicate two antenna ports in the M antenna ports, wherein an interval between port numbers of the two antenna ports is n, and wherein the value of n is greater than or equal to 1.

5. The method according to claim 3, wherein the value of n is configured by the base station by using signaling, or n is a predefined value.

6. A non-transitory computer readable storage medium comprising instructions which, when executed by a computer, cause the computer to perform the method according to claim 1.

7. User equipment (UE), comprising a transceiver and at least one processor, wherein:
the transceiver is configured to receive signaling from a base station, wherein the signaling is used to instruct to feed back transmit diversity-based channel state information;
the at least one processor is configured to generate feedback information, wherein the feedback information comprises precoding matrix indicator (PMI), wherein the PMI is used to indicate a precoding matrix in a precoding matrix set, wherein a structure of the precoding matrix comprises at least one of $$\begin{bmatrix} W_1 & 0 \\ 0 & W_2 \end{bmatrix}$$

and $$\begin{bmatrix} W_1 & W_2 \\ \varphi W_1 & -\varphi W_2 \end{bmatrix},$$

wherein $W_1$ and $W_2$ are different vectors, and wherein $\varphi$ is a phase factor; and
the transceiver is further configured to send the feedback information to the base station.

8. The UE according to claim 7, wherein the PMI comprises a first PMI and a second PMI, wherein the first PMI and the second PMI are used to jointly indicate the precoding matrix in the precoding matrix set, wherein the first PMI is used to indicate a column vector set, and wherein the second PMI is used to indicate a first column vector and a second column vector in the column vector set.

9. The UE according to claim 8, wherein the first column vector indicates a $K^{th}$ column in the column vector set, wherein the second column vector indicates an $L^{th}$ column in the column vector set, wherein an absolute value of a difference between K and L is greater than or equal to n, wherein K and L are positive integers, and wherein a value of n is greater than or equal to 1.

10. The UE according to claim 7, wherein the transceiver is further configured to receive M reference signals from the base station through M antenna ports, wherein the M reference signals are respectively associated with precoding vectors, wherein the PMI is used to indicate two antenna ports in the M antenna ports, wherein an interval between port numbers of the two antenna ports is n, M is an integer greater than or equal to 2, and wherein the value of n is greater than or equal to 1.

11. The UE according to claim 7, wherein the transceiver learns of the value of n by receiving the signaling from the base station, or the value of n is predefined.

12. A precoding method, comprising:
selecting a precoding matrix from a precoding matrix set, wherein a structure of the precoding matrix comprises at least one of $$\begin{bmatrix} W_1 & 0 \\ 0 & W_2 \end{bmatrix}$$

and $$\begin{bmatrix} W_1 & W_2 \\ \varphi W_1 & -\varphi W_2 \end{bmatrix},$$

wherein $W_1$ and $W_2$ are different vectors, wherein $\varphi$ is a phase factor, and wherein the precoding matrix is used for transmit diversity-based data transmission; and precoding a to-be-sent signal by using the selected precoding matrix.

13. The method according to claim 12, wherein the precoding a to-be-sent signal by using the selected precoding matrix comprises:

precoding a signal matrix by using the precoding matrix, wherein a structure of the signal matrix is $$\begin{bmatrix} S_1 & S_2 \\ -S_2^* & S_1^* \end{bmatrix},$$

wherein $S_1$ is a first part of the to-be-sent signal, wherein $S_2$ is a second part of the to-be-sent signal, and wherein * is a conjugate symbol.

14. The method according to claim 12, wherein data sent on a first antenna port in the signal matrix is precoded by using a column of the precoding matrix, and wherein data sent on a second antenna port in the signal matrix is precoded by using another column of the precoding matrix.

15. The method according to claim 14, wherein the data sent on the first antenna port is in a row of the signal matrix, and wherein the data sent on the second antenna port is in another row of the signal matrix.

16. The method according to claim 12, further comprising:

sending signaling to user equipment (UE), wherein the signaling is used to instruct to feed back transmit diversity-based channel state information.

17. The method according to 16, further comprising receiving a precoding matrix indicator (PMI) from the UE, wherein the PMI is used to indicate the precoding matrix, wherein the structure of the precoding matrix comprises at least one of $$\begin{bmatrix} W_1 & 0 \\ 0 & W_2 \end{bmatrix}$$

and $$\begin{bmatrix} W_1 & W_2 \\ \varphi W_1 & -\varphi W_2 \end{bmatrix},$$

wherein $W_1$ and $W_2$ are different vectors, and wherein $\varphi$ is a phase factor.

18. The method according to claim 17, wherein the PMI comprises a first PMI and a second PMI, wherein the first PMI and the second PMI are used to jointly indicate the precoding matrix, wherein the first PMI is used to indicate a column vector set, and wherein the second PMI is used to indicate a first column vector and a second column vector in the column vector set.

19. The method according to claim 18, wherein the first column vector indicates a $K^{th}$ column in the column vector set, wherein the second column vector indicates an $L^{th}$ column in the column vector set, wherein an absolute value of a difference between K and L is greater than or equal to n, wherein K and L are positive integers, and wherein a value of n is greater than or equal to 1.

* * * * *

UNITED STATES PATENT AND TRADEMARK OFFICE
CERTIFICATE OF CORRECTION

PATENT NO. : 10,581,497 B2
APPLICATION NO. : 16/504832
DATED : March 3, 2020
INVENTOR(S) : Kunpeng Liu, Xueru Li and Bingyu Qu Page 1 of 1

It is certified that error appears in the above-identified patent and that said Letters Patent is hereby corrected as shown below:

In the Claims

In Column 30, Line 4, in Claim 17, after "to" insert -- claim --.

Signed and Sealed this
Sixth Day of April, 2021

Drew Hirshfeld
*Performing the Functions and Duties of the*
*Under Secretary of Commerce for Intellectual Property and*
*Director of the United States Patent and Trademark Office*